United States Patent [19]

Sawabe et al.

[11] Patent Number: 5,351,132
[45] Date of Patent: Sep. 27, 1994

[54] METHOD OF RECORDING AND REPRODUCING INFORMATION ON A VIDEO DISK UTILIZING TABLE OF CONTENTS DATA

[75] Inventors: Takao Sawabe; Ryuichi Todoroki; Takashi Sakakibara, all of Tokorozawa, Japan

[73] Assignee: Pioneer Electronic Corporation, Tokyo, Japan

[21] Appl. No.: 942,745

[22] Filed: Sep. 9, 1992

[30] Foreign Application Priority Data

Sep. 9, 1991 [JP] Japan .................. 3-257051

[51] Int. Cl.$^5$ .............................................. G11B 7/00
[52] U.S. Cl. ............................................... 358/342
[58] Field of Search ............... 358/342, 313, 335, 310, 358/330; 369/44.26, 54, 48, 58

[56] References Cited

U.S. PATENT DOCUMENTS

| | | | |
|---|---|---|---|
| 4,885,644 | 12/1989 | Ishii et al. | 358/342 |
| 5,038,219 | 8/1991 | Yamashita et al. | 358/310 |
| 5,063,551 | 11/1991 | Yoshio et al. | 369/68 |
| 5,122,886 | 6/1992 | Tanaka | 358/335 |
| 5,148,422 | 9/1992 | Sako et al. | 369/44.26 |
| 5,257,111 | 10/1993 | Kakuyama | 358/342 |

Primary Examiner—Tommy P. Chin
Assistant Examiner—Robert Chevalier
Attorney, Agent, or Firm—Kane, Dalsimer, Sullivan, Kurucz, Levy, Eisele and Richard

[57] ABSTRACT

A method of recording information on a video disk, includes the steps of: recording a video signal on the video disk; and recording table-of-contents data to control reproduction of the recorded video signal, on a plurality of frames in a lead-in area of the video disk. The table-of-contents data has a data structure, which is completed in each of the plurality of frames and is repeatedly identical in each of the plurality of frames adjacent to each other.

9 Claims, 17 Drawing Sheets

| | | SYNC | | | | | | | | | | | |
|---|---|---|---|---|---|---|---|---|---|---|---|---|---|
| BIT No. | 11 | 10 | 9 | 8 | 7 | 6 | 5 | 4 | 3 | 2 | 1 | 0 |
| ALL VIDEO FRAMES | 1 | 1 | 1 | 1 | 1 | 1 | 1 | 0 | 0 | 1 | 0 | 0 |

FIG. 11

| | MODE | | | | | | | |
|---|---|---|---|---|---|---|---|---|
| BIT No. | 7 | 6 | 5 | 4 | 3 | 2 | 1 | 0 |
| LEAD-IN VIDEO FRAME | PF | SZ | DF | SD | FVN | | TVN | |
| PROGRAM VIDEO FRAME | PF | SZ | DF | SD | FVN | | TA | * |
| LEAD-OUT VIDEO FRAME | PF | SZ | DF | SD | FVN | | * | |

FIG. 12

| | CADR | |
|---|---|---|
| BIT No. | 7 | 6 5 4 3 2 1 0 |
| LEAD-IN VIDEO FRAME | CF | TCN |
| PROGRAM VIDEO FRAME | CF | CHN |
| LEAD-OUT VIDEO FRAME | CF | * |

FIG.13

| BIT No. | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| | | | | FADR1 | | | | | | | | | | | | | | | | |
| LEAD-IN VIDEO FRAME | * | 0 | 0 | | | | | | | | UFN | | | | | | | | | |
| PROGRAM VIDEO FRAME | * | 0 | 1 | | | | | | | | UFN | | | | | | | | | |
| LEAD-OUT VIDEO FRAME | * | 1 | 1 | | | | | | | | UFN | | | | | | | | | |

$\overline{ADST}$

FIG. 14

| | ADST 18 17 | UFN 16 15 ---- --- 2 1 0 | |
|---|---|---|---|
| LEAD-IN AREA | 00 ⋮ ⋮ ⋮ ⋮ 00 | 1 1 1 1 1 1 1 0 0 0 0 1 0 0 0 0 1 ⋮ ⋮ ⋮ ⋮ 1 1 1 1 1 1 1 1 1 1 1 1 1 1 1 1 1 | (1FC21) |
| PROGRAM AREA | 01 ⋮ ⋮ ⋮ ⋮ 01 | 0 0 0 0 0 0 0 0 0 0 0 0 0 0 0 0 0 ⋮ ⋮ ⋮ ⋮ 1 1 0 1 0 0 1 0 1 1 1 0 1 1 1 1 1 | (1A5DF) |
| LEAD-OUT AREA | 11 11 ⋮ ⋮ ⋮ | 1 1 0 1 0 0 1 0 1 1 1 1 0 0 0 0 0 1 1 0 1 0 0 1 0 1 1 1 1 0 0 0 0 1 ⋮ ⋮ ⋮ | |

FIG. 15

| BIT No. | FADR2 ||||||||||||||||||||
|---|---|---|---|---|---|---|---|---|---|---|---|---|---|---|---|---|---|---|---|---|
| | 19 | 18 | 17 | 16 | 15 | 14 | 13 | 12 | 11 | 10 | 9 | 8 | 7 | 6 | 5 | 4 | 3 | 2 | 1 | 0 |
| LEAD-IN VIDEO FRAME | * | * | LFN |||||||||||||||||
| PROGRAM VIDEO FRAME | ST | SPC || CFN |||||||||||||||||
| LEAD-OUT VIDEO FRAME | * | * | CFN |||||||||||||||||

FIG. 16

| | SPC || STILL PICTURE USE FIELD ||
|---|---|---|---|---|
| BIT No. | 16 | 17 | LEADING FIELD | NUMBER |
| | 0 | 0 | 1ST FIELD | 4 FIELDS |
| | 0 | 1 | 2ND FIELDS | 4 FIELDS |
| | 1 | 0 | 1ST FIELD | 2 FIELDS |
| | 1 | 1 | 2ND FIELDS | 2 FIELDS |

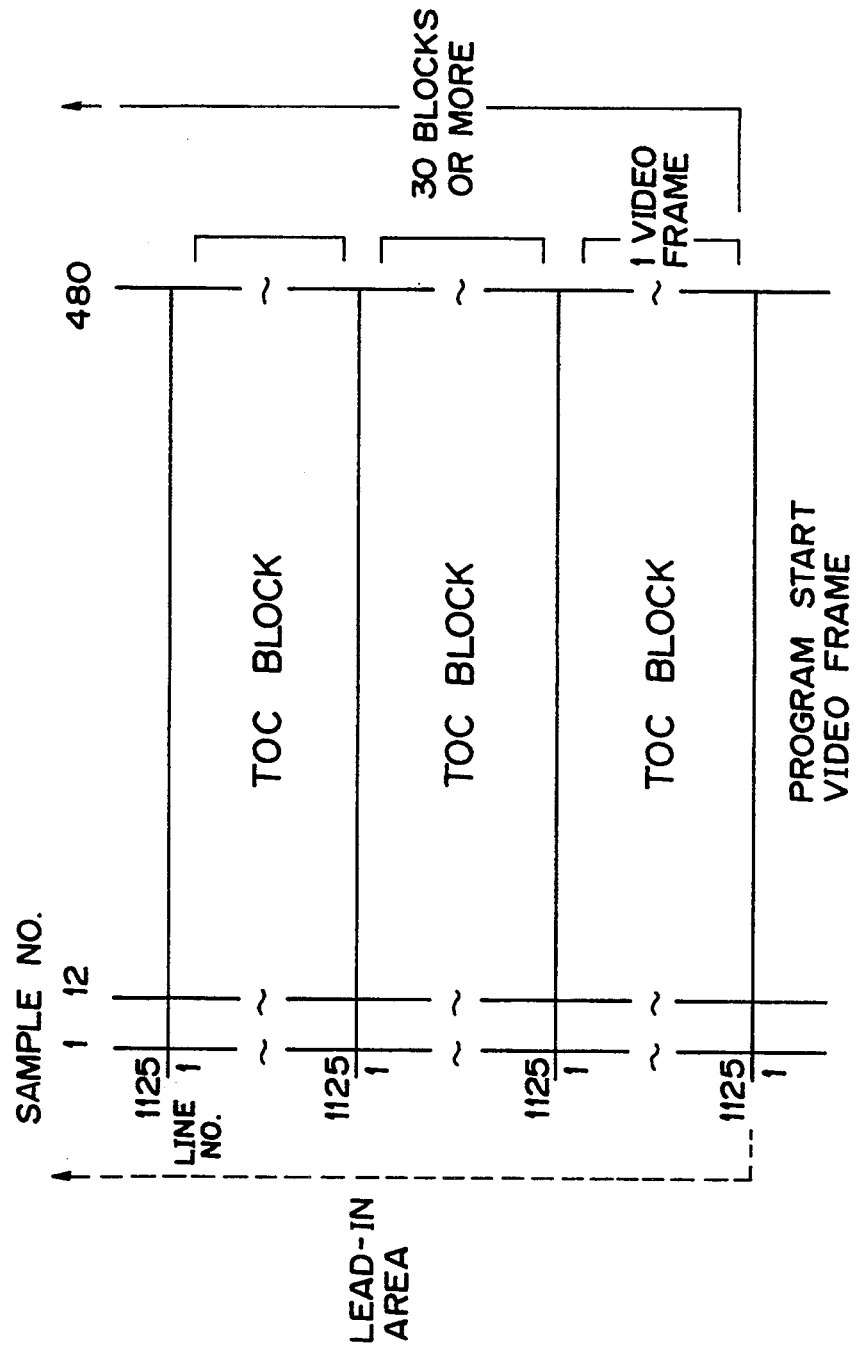

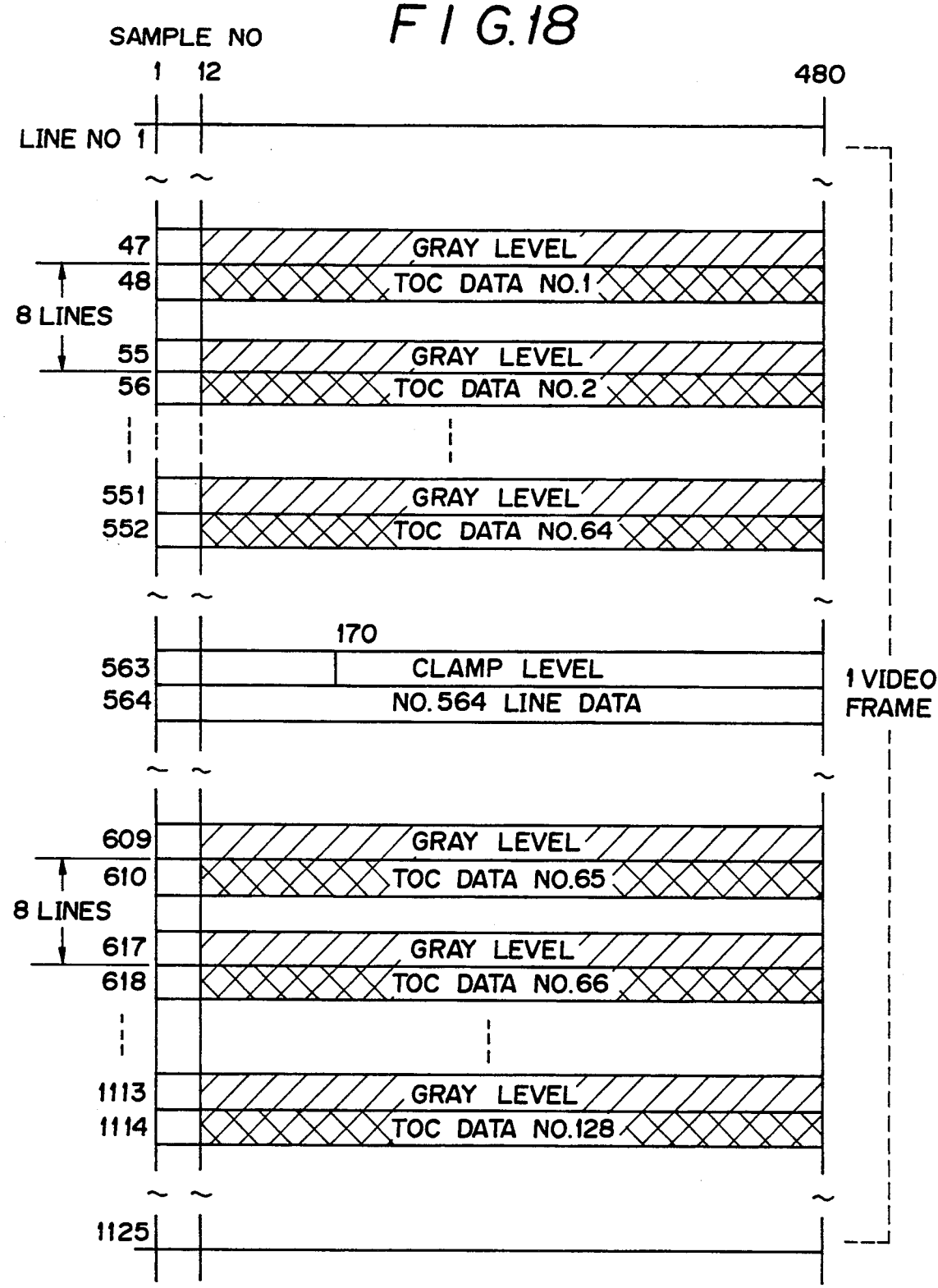

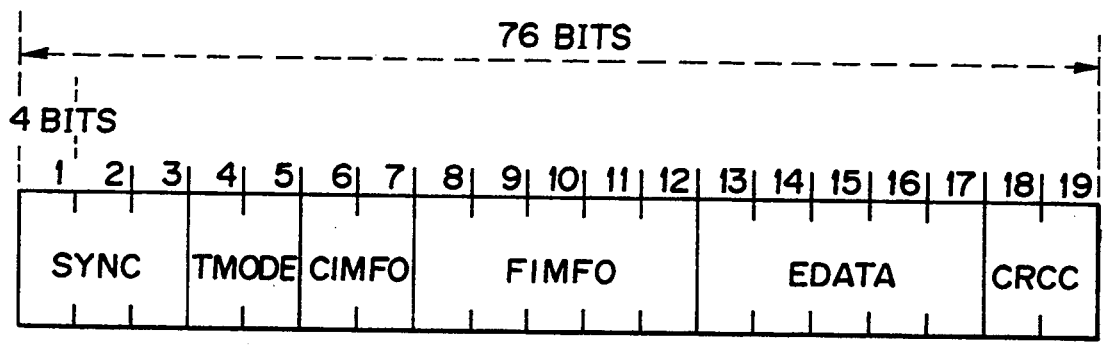

FIG. 22

| TOC DATA LINE No. | BIT No. | TMODE 7 | 6 | 5 | 4 | 3 | | | CIMFO 7 | 6 | 5 | 4 | 3 | 2 | 1 | 0 | | 19 | 18 | 17 | 16 | FIMFO 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|
| 1 | | 1 | 0 | 0 | 1 | 0 | | | * | SCN1 | | | | | | | | * | 0 | 0 | | * | | | | | 1 | 1 | 1 | 0 |
| 2 | | 1 | 0 | 0 | 1 | 1 | | | * | SCN2 | | | | | | | | * | 0 | 0 | | * | | | | | | | | |
| 3 | | 1 | 1 | 0 | 0 | 1 | | | * | LCN1 | | | | | | | | * | 0 | 0 | | LFN1 | | | | | | | | |
| 4 | | 1 | 1 | 0 | 1 | 1 | | | * | LCN2 | | | | | | | | * | 0 | 0 | | LFN2 | | | | | | | | |
| 5 | | 1 | 1 | 1 | TS | 1 | | | * | SCN1 | | | | | | | | * | 0 | 0 | | SFN1 | | | | | | | | |
| 6 | | 1 | 1 | 1 | TS | 1 | | | * | SCN2 | | | | | | | | * | 0 | 0 | | SFN2 | | | | | | | | |
| 7 | | 1 | 1 | 1 | TS | 1 | | | | SCN3 | | | | | | | | * | | | | SFN3 | | | | | | | | |
| | | | | | | | | | | → | | | | | | | | | | | | → | | | | | | | | |
| m+3 | | | | | | | | | * | SCNm-1 | | | | | | | | * | 0 | 0 | | SFNm-1 | | | | | | | | |
| m+4 | | 1 | 1 | 1 | TS | | | | * | SCNm | | | | | | | | * | 0 | 0 | | SFNm | | | | | | | | |
| m+5 | | 0 | 0 | 0 | 0 | 0 | | | 0 | 0 | 0 | 0 | 0 | 0 | 0 | 0 | | | 0 | 0 | | 0 | 0 | 0 | 0 | 0 | 0 | 0 | 0 | 0 |
| | | | | | | | | | | → | | | | | | | | | | | | → | | | | | | | | |
| 128 | | 0 | 0 | 0 | 0 | 0 | | | 0 | 0 | 0 | 0 | 0 | 0 | 0 | 0 | | * | 0 | 0 | | 0 | 0 | 0 | 0 | 0 | 0 | 0 | 0 | 0 |

FIG. 23

METHOD OF RECORDING AND REPRODUCING INFORMATION ON A VIDEO DISK UTILIZING TABLE OF CONTENTS DATA

BACKGROUND OF THE INVENTION

1. Field of the Invention

The present invention generally relates to a method of recording information on a video disk, such as a LD (Laser Disk), and more particularly to a method of recording TOC (Table-Of-Contents) information in the recording of a MUSE (Multiple Sub-Nyquist Sampling Encoding) signal.

2. Description of Related Art

Recently, there has been considerable activity in the development of high-vision broadcasting suitable for high-definition television broadcasting. In the high-vision broadcasting, the aspect ratio of a picture plane of a television set is as large as 16:9. Further, the number of scanning lines is as many as 1125. Hence, the high-vision broadcasting is capable of transmitting high-definition television signals, and is quite different from the conventional NTSC system.

A high-vision signal is transmitted to users by utilizing a BS (Broadcasting Satellite). Usually, the high-vision signal needs a transmission band approximately equal to or larger than five times the transmission bands of the existing television broadcasting systems. Hence, if the high-vision signal is transmitted without any processing, it is impossible to transmit the high-vision signal within a band width equal to one channel of the BS.

In order to transmit the high-vision signal within a band width equal to one channel of the BS, a MUSE system has been developed, as disclosed in "DEVELOPMENT OF MUSE SYSTEM", NHK (Japan Broadcasting Association) Technical Study, Vol. 39, No. 2, Ser. No. 172, 1987, or "HIGH-VISION SATELLITE TRANSMISSION SYSTEM-MUSE", The Journal of the Institute of Television Engineers of Japan, Vol. 42, No. 5, 1988. In the MUSE system, the high-vision signal is processed by multiple sub-sampling so that it is compressed in a transmission band of 8.1MHz and transferred in analog form. A band compressed signal is called as a "MUSE signal".

The above is an outline of the high-vision broadcasting and MUSE system. It is possible to apply the above technique to the recording or reproducing of video signals for video disks, such as laser disks, as in the case of the conventional NTSC system. That is, analog MUSE signals are recorded on video disks.

According to the present inventor's research in the application of this MUSE signal to the video disk recording, it can be seen from the transmission signal format of the MUSE signal that the MUSE system has an undefined line, which is a line having a horizontal scanning period number (hereinafter, referred to as a line number) "564" in case that the MUSE system is applied to the video disk recording. Namely, in the broadcasting system, the undefined line is used as a program transmission control signal, while this is not needed in a non-broadcasting system. That is, the No. 564 line is a "free" line in the video disk recording.

Accordingly, the inventors of the present invention have found that it is possible to improve operationability and functionality of video disk players by inserting predetermined data into this free line having the line number 564. The predetermined data is, for example, data for controlling a video disk player, and data for reproduction control, such as address data related to information recorded on a video disk. Hereinafter, the predetermined data as described above is referred to as a disk code DSCD.

At present, there is no united or specified standard concerning the disk code DSCD for the No. 564 line recorded on the video disk, according to the related arts.

Meanwhile, in the NTSC system, table-of-contents information (hereinafter simply referred to as TOC data or information) concerning the address of information recorded on the video disk is not recorded thereon. In a random access operation on the video disk in conformity with the NTSC system, desired information is searched for using a frame number inserted into a program area, or using a chapter number inserted therein if the chapter number is recorded on the video disk, which requires rather complicated system structure and in which the search can be enabled rather slowly.

SUMMARY OF THE INVENTION

It is therefore an object of the present invention to provide a method of recording information on a video disk which can allow easy and speedy information reproduction operation of the video disk player and improve controllability and operationability of the video disk player.

The above object of the present invention can be achieved by a method of recording information on a video disk, including the steps of: recording a video signal on the video disk; and recording table-of-contents data to control reproduction of the recorded video signal, on a plurality of frames in a lead-in area of the video disk. The table-of-contents data has a data structure, which is completed in each of the plurality of frames and is repeatedly identical in each of the plurality of frames adjacent to each other.

According to the present invention, since the table-of-contents data is recorded on the lead-in area of the video disk, the controllability and operationability of the video disk players can be improved by use of the table-of-contents data. Here, since the identical table-of-contents data is repeatedly recorded over a plurality of adjacent frames, and has a data structure completed in each frame, the management of the table-of-contents data can be performed by a unit block, so that the signal processing by use of a microcomputer can be easily executed, and that, in case of a dropout in the reproduction operation, the re-reading of the table-of-contents data can be easily and speedily enabled by jumping-back with respect to just each frame unit.

In one aspect of the present invention, the video signal is a MUSE signal and the table-of-contents data is recorded on the video signal area of the MUSE signal, for example at the line No. 47 to 562 and/or No. 608 to 1124. In this case, since the table-of-contents data is recorded in the video signal area other than the frame pulse and control signal areas, which are necessary for the reproduction of the MUSE signal, the table-of-contents data can improve the controllability and operationability of the video disk player without interrupting the operation of a MUSE decoder in the reproduction operation.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 11 is a diagram showing a data format of a control mode identification code (MODE);

FIG. 12 is a diagram showing a data format of a chapter address code (CADR);

FIG. 13 is a diagram showing a data format of a first frame address code (FADR1);

FIG. 14 is a diagram showing a data format of a universal frame number code (UFN);

FIG. 15 is a diagram showing a data format of a second frame address code (FADR2);

FIG. 16 is a diagram showing a data format of a still picture mode identification mode (SPC);

FIG. 17 is a diagram showing a recording position of a TOC data block (TBLK);

FIG. 18 is a diagram showing a recording format of the TOC data block (TBLK);

FIG. 19 is a diagram showing a data format of TOC data (TD);

FIG. 20 is a diagram showing a data format of a header (SYNC);

FIG. 21 is a diagram showing a data format of an in-TOC information code (TMODE);

FIG. 22 is a diagram showing a data format of a chapter information code (CIMFO) and a frame information code (FIMFO);

FIG. 23 is a diagram showing a data format of an extended data code (EDATA);

DESCRIPTION OF THE PREFERRED EMBODIMENTS

A description will now be given of a preferred embodiment of the present invention.

[I] Recording system of MUSE signal

Figure 1:
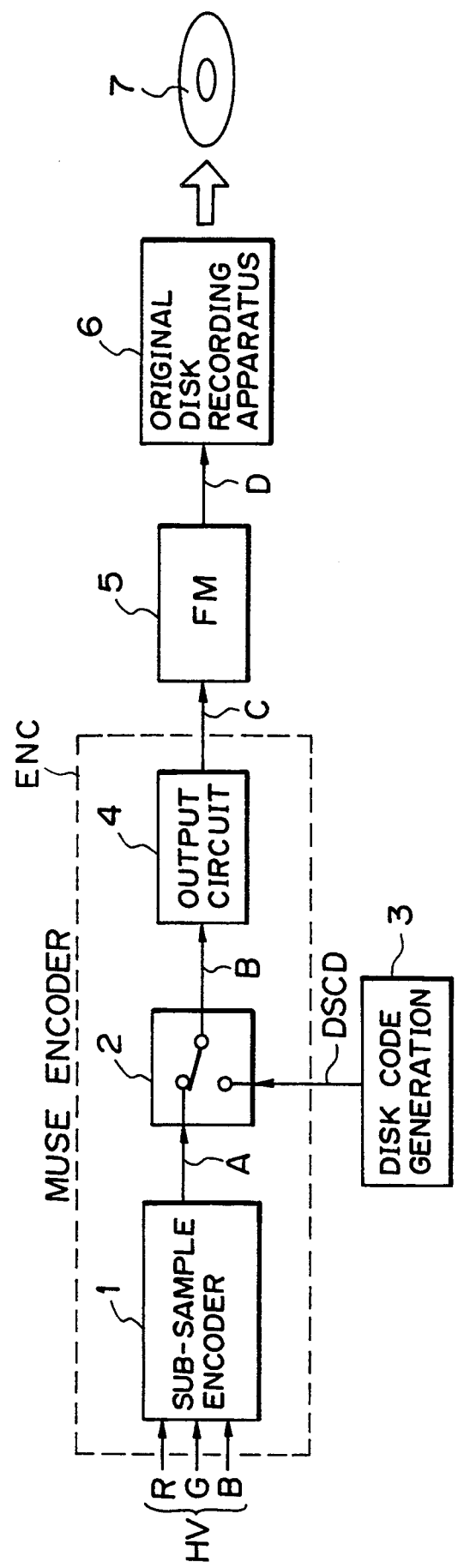
FIG. 1 is a block diagram of a MUSE signal recording system.

FIG. 1 shows an overview of a MUSE signal recording system (video signal system) to which the present invention is applied. A high-vision signal HV to be recorded is inputted to a MUSE encoder ENC, which includes a sub-sample encoder 1, a disk code inserting circuit 2, a disk code generating circuit 3, and an output circuit 4. The high-vision signal HV has R, G and B signal components. The sub-sample encoder 1 converts the high-vision signal into a digital signal and encodes the digital signal into a digital MUSE signal A by a multiple sub-sampling method. The disk code inserting circuit 2 inserts the disk code DSCD into a free line FL (an undefined horizontal line having line number 564; explained later in detail) in each video frame of the digital MUSE signal A outputted from the sub-sample encoder 1. The disk code generating circuit 3 supplies the disk code DSCD to the disk code inserting circuit 2. The output circuit 4 carries out a filtering process for a multiplexed MUSE signal B outputted from the disk code inserting circuit 2, and then converts a filtered signal into an analog signal. In this manner, an analog MUSE signal C is outputted by the output circuit 4.

The analog MUSE signal C is outputted to an FM (Frequency Modulation) circuit 5, which frequency-modulates the analog MUSE signal C. An FM signal D outputted from the FM circuit 5 is applied to an original disk recording apparatus 6. An original disk 7 has recording surfaces and photoresist films respectively coated thereon. The original disk recording apparatus 6 projects a light beam modulated by the FM signal D onto the original disk 7, and hence signal pits are recorded on the recording surfaces. In this manner, the analog MUSE signal which has been frequency-modulated is recorded on the original disk 7. It will be noted that the disk code DSCD has been inserted into the free line FL of each video frame in the analog MUSE signal. A process for producing a large number of video disks from the original disk 7 do not directly relate to the present invention, and a description thereof will be omitted here.

[II] Reproduction system of MUSE signal

Figure 2:
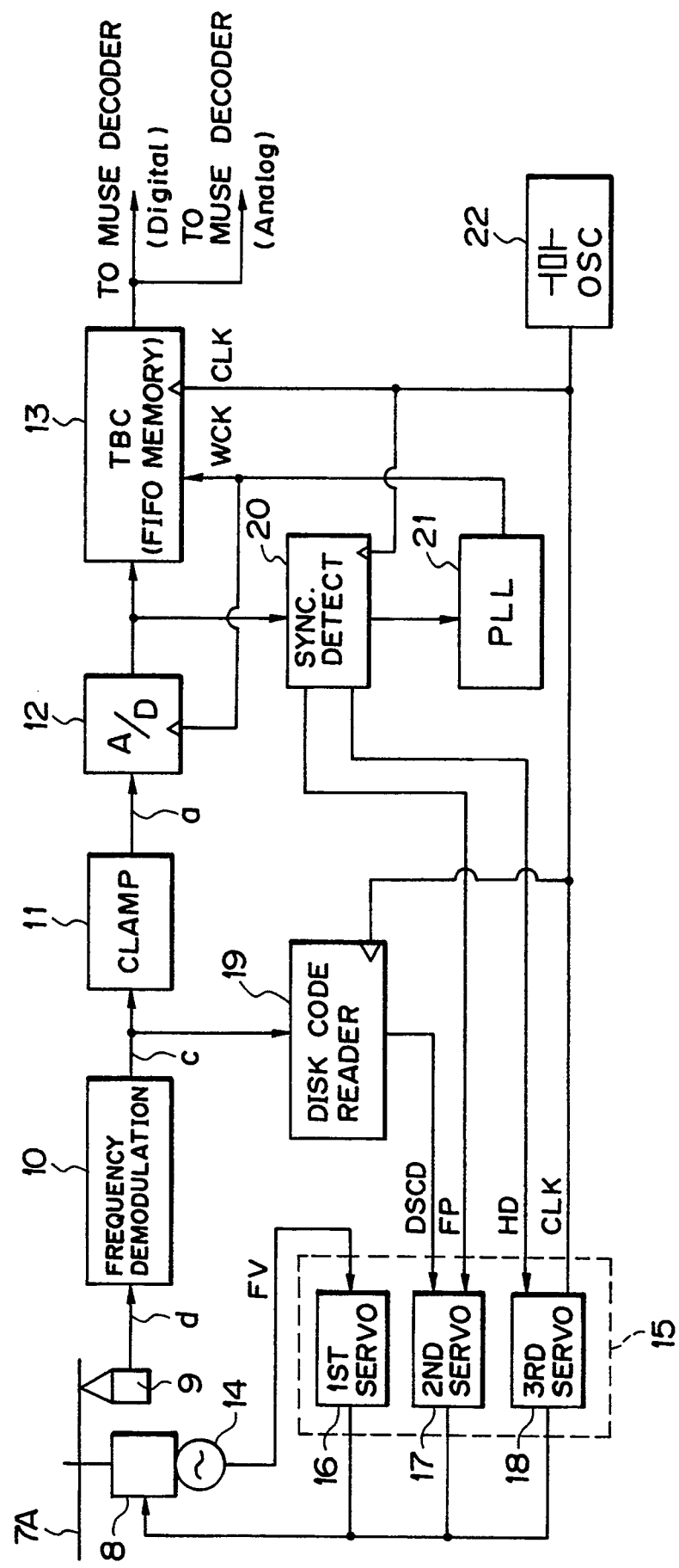
FIG. 2 is a block diagram of a MUSE signal reproducing system.

FIG. 2 shows an overview of a driving control system for a spindle motor and a read signal processing system in a video disk player of an optical MUSE system. The reason why the reproduction system of the MUSE signal is utilized here, is that the present invention has an advantage during an operation in which the disk code DSCD is read and the video disk player is controlled based on the readout disk code DSCD.

In order to correctly decode the MUSE signal by means of a MUSE decoder, it is necessary to control the rotation velocity of a spindle motor 8 so that a horizontal synchronizing signal HD of the MUSE signal recorded on a video disk 7A, which is produced from the original disk 7, is reproduced at predetermined time intervals. The rotation velocity of the spindle motor 8 increases to a prescribed rotation velocity from a low rotation velocity after it is activated. With the above in mind, a spindle servo circuit 15 has a three-stage servo system, which gradually increases precision of the adjustment of the rotation velocity of the spindle motor 8 in accordance with increase in the rotating condition and which finally rotates the spindle motor 8 in synchronism with the horizontal synchronizing signal HD. That is, the rotation velocity of the spindle motor 8 is roughly adjusted in a first (initial) adjustment stage, and is finely adjusted in the second adjustment, and then, the synchronization is achieved in the third adjustment stage. In order to realize the above three-stage servo system, the spindle servo circuit 15 is provided with a first servo circuit 16, a second servo circuit 17 and a third servo circuit 18.

The first servo circuit 16 roughly adjusts the rotation velocity of the spindle motor 8 immediately after it is started. The first servo circuit 16 compares the frequency of a reference pulse signal generated by a built-in reference pulse generator with the frequency of a rotation velocity signal FV generated by a rotation velocity detector 14 attached to the spindle motor 8, and controls the rotation velocity of the spindle motor 8 with a precision which mainly depends on a precision of the rotation velocity detector 14.

While the video disk 7A is rotated by the spindle motor 8, a pickup 9 optically reads information (signal pits) recorded on the video disk 7A and converts optical information into an electric signal. This electric signal is applied, as a reproduced RF signal d, to a frequency demodulation circuit 10. The FM demodulation circuit 10 frequency-demodulates the reproduced RF signal d (frequency modulated signal) to thereby generate an original MUSE signal c. As shown in FIG. 2, the demodulated original MUSE signal c is applied to a clamp circuit 11 and a disk code reader 19. The demodulated original MUSE signal c is processed by means of the clamp circuit 11, an A/D converter 12 and a TBC (Time Base Corrector) 13 which has a FIFO (First In First Out) memory, and is then applied to a MUSE decoder. At this time, the rotation velocity of the spindle motor 8 has not yet been regulated at the defined rotation velocity, and hence the original MUSE signal C will have an error.

However, it is possible to read, by the precision of the rotation velocity regulated by the first servo circuit 16, the disk code DSCD inserted into the free line FL having the line number 564 contained in the demodulated MUSE signal. Accordingly, the disk code DSCD is read by the disk code reader 19, to which a clock signal CLK is inputted from an oscillator 22, and used for controlling rotation velocity control by the second servo circuit 17.

The second servo circuit 17 receives the disk code DSCD from the disk code reader 19 and a frame pulse FP from a synchronization detection circuit 20, and controls the single motor 8 so that the disk code DSCD and the frame pulse FP are respectively reproduced at reference times. That is, the servo control of the spindle motor 8 is switched from the rough adjustment by the first servo circuit 16 to the fine adjustment by the second servo circuit 17 when the rotation velocity of the spindle motor 8 has reached the reference value defined for the first servo circuit 16. By the fine adjustment by the second servo circuit 17, the frame pulse FP included in the MUSE signal can be detected by the synchronization detection circuit 20. A PLL (Phase Lock Loop) circuit 21 is provided between the synchronization detection circuit 20 and the TBC 13 to establish the phase lock loop by Giving the WCK signal to the TBC 13 which is Generated on the basis of the output signal of the synchronization detection circuit 20. The detected frame pulse FP is supplied from the synchronization detection circuit 20 to the second servo circuit 17. The frame pulse FP and the disk code DSCD are signals assigned for each frame in the MUSE signal. In order to detect these signals, the second servo circuit 17 finely controls the rotation velocity of the spindle motor 8. The rotation velocity control by means of the second servo circuit 17 is carried out not only when the spindle motor 8 is activated but also when the rotation velocity of the spindle motor 8 temporarily becomes out of the prescribed rotation velocity. For example, when various searching operations, such as picture searching operations, are performed, the spindle motor 8 is controlled so as to rotate at a velocity other than the prescribed rotation velocity for normal reproduction operation. In this manner, the disk code DSCD is useful in detecting a reproduced signal time base. The details of a format of the disk code DSCD will be described later.

When the rotation velocity of the spindle motor 8 has been regulated at a rotation velocity synchronized with the disk code DSCD and the frame pulse FP, it becomes possible for the synchronization detection circuit 20 to detect the horizontal synchronizing signal HD from the reproduced MUSE signal. The detected horizontal synchronizing signal HD is applied to the third servo circuit 18. At this time, the servo control of the spindle motor 8 is switched from the second servo circuit 17 to the third servo circuit 18. Thereafter, the rotation velocity of the spindle motor 8 is more finely controlled on the basis of the horizontal synchronizing signal HD by means of the third servo circuit 18.

When a servo loop by means of the third servo circuit 18 has been established, the reproduced RF signal d from the pickup 9 is frequency-demodulated by the frequency demodulation circuit 10, and the demodulated MUSE signal c is applied to the clamp circuit 11. The clamp circuit 11 clamps the signal of the predetermined line (line number 563) in the MUSE signal at a clamp level (a 128/256 level), so that a DC (Direct Current) component is reproduced. A MUSE signal a outputted from the clamp circuit 11 is converted into a digital signal by the A/D converter 12, and then the digital signal is applied to the time base corrector (TBC) 13. The TBC 13 corrects fluctuations or jitters in the time base which arise from an eccentricity of the video disk 7A or the like. This time base correction is carried out by using the FIFO memory of the TBC 13.

The present invention relates to a method of recording the disk code DSCD on the video disk, and thus a further description of the spindle servo control will be omitted. However, a more detailed description of the spindle servo control is described, for example in "DEVELOPMENT (2) OF OPTICAL MUSE TYPE VIDEO DISK SYSTEM: PLAYER", ITEC '90, 9-7, Japanese Patent Application Number 01-180811, and so on.

[III] Transmission signal format of MUSE signal

Figure 3:
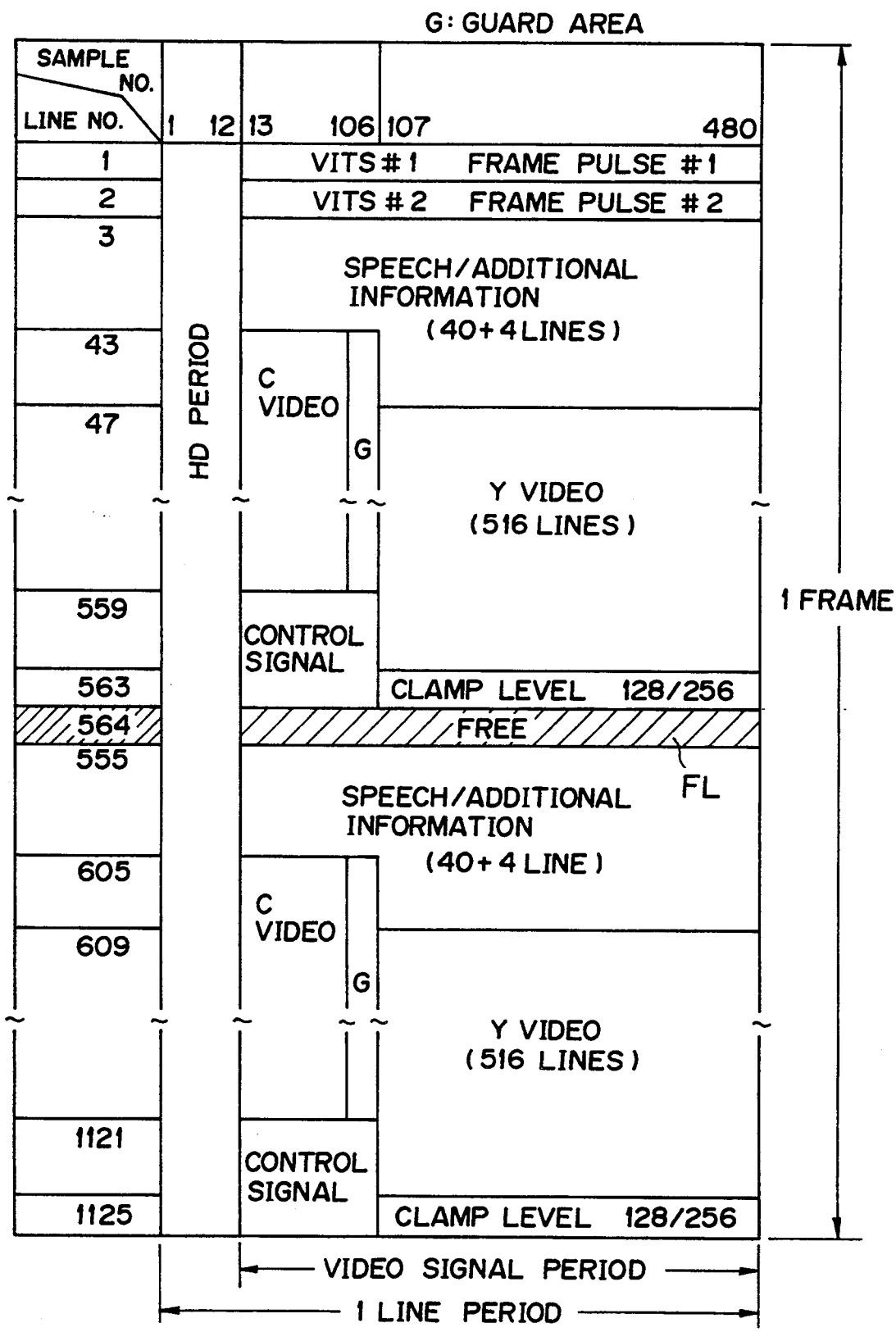
FIG. 3 is a diagram showing a transmission signal format of a MUSE signal.
Figure 4:
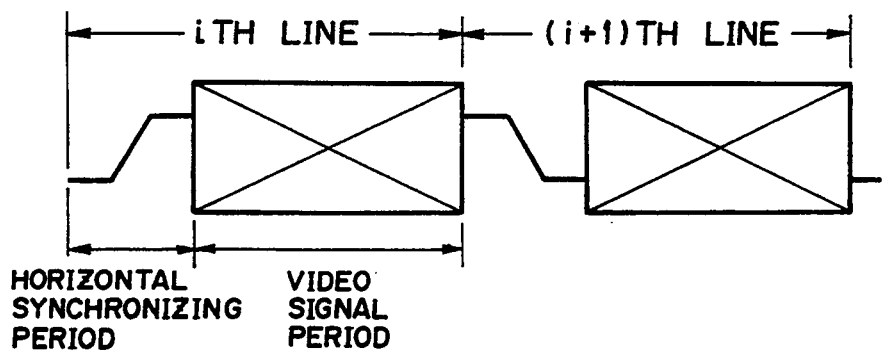
FIG. 4 is a waveform diagram of a MUSE signal.
Figure 5:
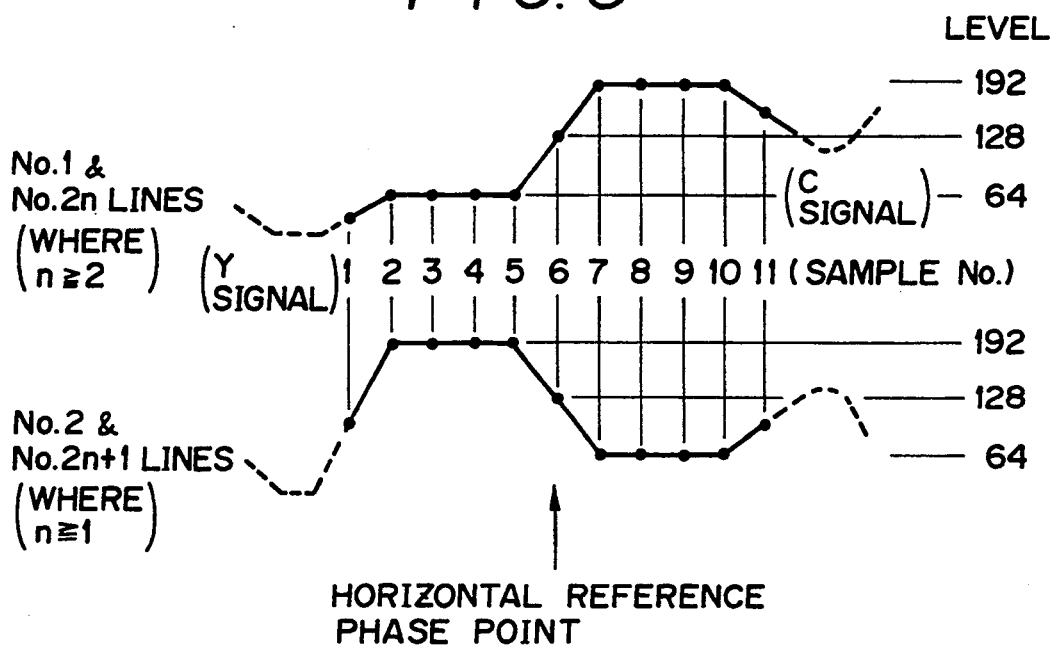
FIG. 5 is a waveform diagram of an HD signal.
Figure 6:
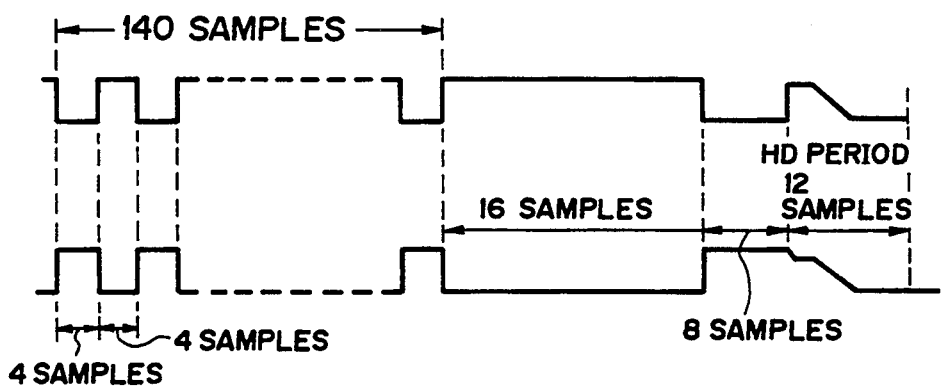
FIG. 6 is a waveform diagram of a signal obtained by reading a frame pulse (FP) line.

FIGS. 3, 4, 5 and 6 will be used in order to facilitate understanding the present invention. FIG. 3 shows a transmission signal format of the MUSE signal, and FIG. 4 is a waveform diagram of the MUSE signal. FIG. 5 is a waveform diagram of the horizontal synchronizing signal HD, and FIG. 6 is a waveform diagram of the frame pulse (FP) line. The details of these signal formats and the synchronizing signal waveform are disclosed in, for example, "STANDARD SYSTEM OF TRANSMISSION CONCERNING HIGH-DEFINITION TELEVISION BROADCASTING", Ordinance No. 16 of Ministry of Postal Services, Article 8, Section 2, appended FIG. 2, and so on. Hence, a part of the above document related to the present invention will now be described.

As shown in FIG. 3, the MUSE signal has a frame consisting of two fields, and 1125 horizontal lines. Each of the lines includes the horizontal synchronizing signal HD located at the leading end thereof, and a subsequent video signal. As has been described previously, the line having line Number 564 is used in the broadcasting system, and no definition is provided for the No. 564 line in the video disks. The disk code DSCD is inserted into this free line FL according to the present invention.

As shown in FIG. 4, the horizontal synchronizing signal HD is added to the MUSE signal within a level range identical to that of the video signal, and has an amplitude approximately half of a peak-to-peak value of the video signal. The HD signal waveform in the (i+1)th line is an inverted version of the HD signal waveform in the ith line.

An HD signal waveform shown in FIG. 5 is reset (the horizontal synchronizing signal HD related to line number 3 rises) when the line inversion has been performed and the frame pulse FP has been sent. The levels related to samples No. 1–11 are arithmetic averages of the levels of two consecutive HD signal waveform samples. For example, the level related to sample No. 1 is an arithmetic average of the levels of the immediately previous sample and the sample No. 2. The level related to sample No. 11 is an arithmetic average of the levels of the sample No. 10 and the immediately behind sample. The MUSE signal consists of 480 sample values in one horizontal scanning period.

Figures shown in FIG. 5 as sample numbers represent sequential sample numbers from the first number in one horizontal scanning period. The time corresponding to the sample number 6 is a horizontal phase reference point, and is used for phase control of a clock generated for resampling of the MUSE signal in a decoder for decoding the MUSE signal.

Figures shown in FIG. 5 as levels represent levels of samples obtained by quantizing the MUSE signal into 256 levels. The level obtained at the horizontal phase reference point is a level of 128, and is a central value of the amplitude of the video signal.

As shown in FIG. 6, the MUSE signal has, together with the horizontal synchronizing signals HD, frame pulses FP which are respectively inserted, as a frame synchronizing signals, into the first and second lines. The waveform inversion of the horizontal synchronizing signals HD is reset by the respective frame pulses FP.

[IV] Multiplexing method of disk code DSCD

Figure 7:
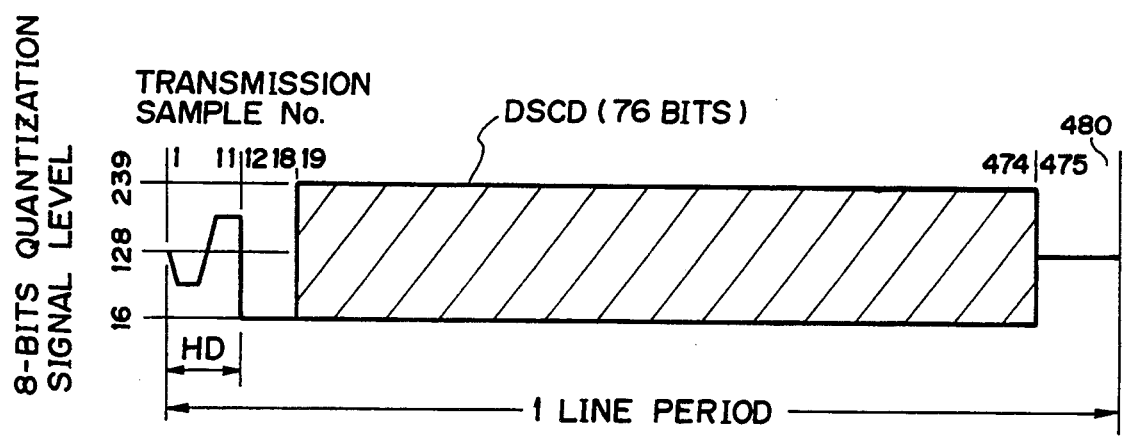
FIG. 7 is a waveform diagram of a signal obtained by reading a disk code (DSCD)
Figure 8:
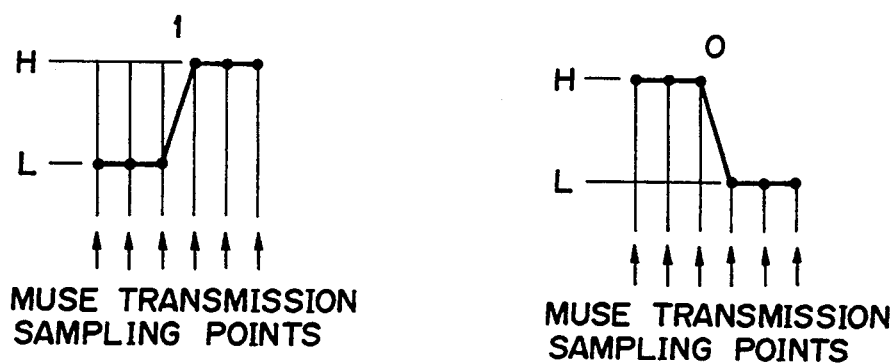
FIG. 8 is a diagram showing how a MUSE signal is sampled in order to transfer it.

FIG. 7 is a waveform diagram of the disk code DSCD. The disk code DSCD is generated by the disk code generating circuit 3 shown in FIG. 1, and is multiplexed, by means of the disk code inserting circuit 2, with the digital MUSE signal A from the sub-sample encoder 1. The free line FL having line number 564 in each frame is obtained during a multiplexing period within which the disk code DSCD is inserted into the MUSE signal A by means of the disk code inserting circuit 2. Examples of the multiplexing method will be described below:

Multiplexing period:
(1) Muse signal line No. 564, Sample Nos. 19–474
(2) Sample Nos. 19–474 in 128 lines of MUSE signal line Nos. 48+8n and 610+8n (n=0–63) within the lead-in area;

Data transmission bit rate: 2.7 Mbits/S, one bit transmission by six 76 bits/video line MUSE signal transmission samples FIG. 8 shows how the MUSE signal is sampled.

[V] Format of disk code DSCD

Figures 9, 10:
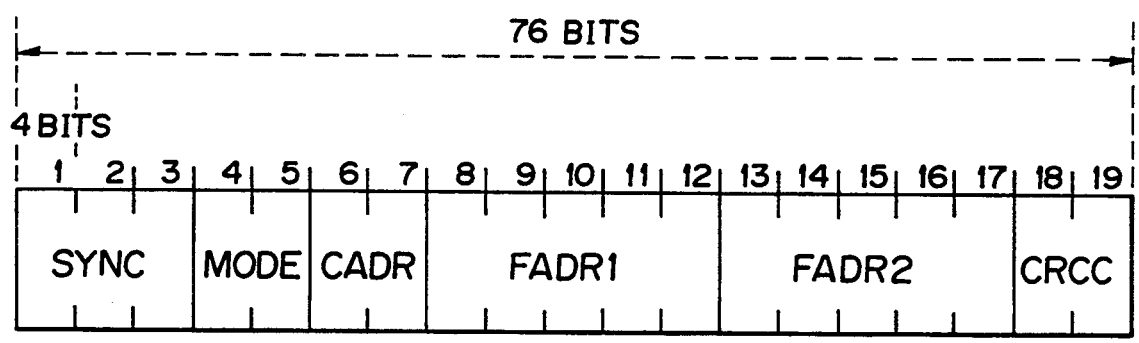
FIG. 9 is a diagram showing a data format of the disk code (DSCD)
FIG. 10 is a diagram showing a data format of a header (SYNC)

FIG. 9 shows a format of the disk code DSCD. The disk code DSCD is inserted, as 76-bit data, within a period corresponding to sample Nos. 19–474 in the line having line number 564 shown in FIG. 8.

As shown in FIG. 9, the disk code DSCD includes, from the sample No. 19 side to the sample No. 474 side, a header SYNC, a control mode identification code MODE, a chapter address code CADR, a first frame address code FADR1, a second frame address code FADR2, and an error detection code CRCC. These codes will now be described below with referring to FIGS. 10 to 16.

(1) Header SYNC (FIG. 10)

The header SYNC is a code for identifying a control signal for a read position of the pickup of the video disk player and for identifying an address signal. FIG. 10 shows an example of the format of the header SYNC. The header SYNC has identical contents except for the free line (undefined horizontal line) FL having line number 564 in each video frame in the lead-in area, a program area and a lead-out area on the video disk 7A, and a line for multiplexing the disk code DSCD other than No. 564 line in the lead-in area.

(2) Control mode identification code MODE ( FIG. 11)

The control mode identification code MODE includes information concerning attributes of the video disk to be reproduced, such as a video disk type and a video disk side, and information concerning a recording area on the video disk in which the disk code DSCD being considered is recorded. As shown in FIG. 11, the control mode identification code MODE has contents dependent on recording areas (thus, video frames corresponding to the recording areas). A description will now be Given of the name and meaning of each bit in the control mode identification code MODE.

PF: Multiplexing period identification bit
  PF="0", which means that the data multiplexing period is within the NO. 564 line (PF="1" for TOC data recorded in the lead-in video frame).
SZ: Disk size identification bit
  SZ="0" for a 30 cm disk
  SZ="1" for a 20 cm disk
DF: Disk format identification bit
  DF="0" for a CAV disk
  DF="1" for a CLV disk
SD: Disk side identification bit
  SD="0" for disk side 1
  SD="1" for disk side 2
FVN: Control and address signal data format identification code
  FVN="00" for the present format
  Undefined for other cases
TVN: TOC format identification code
  TVN="00" for the present format
  Undefined for other cases
*: Undefined
TA: TOC presence identification bit
  TA="0" when TOC data is not recorded.
  TA="1" when TOC data is recorded.

The reason why the TOC presence identification bit TA is arranged in the disk code DSCD in the program video frame is as follows. The video disk player is activated in the program area. During this time, it is determined whether or not the TOC data has been recorded. When TA=1, the pickup is moved to the lead-in area, and the presence of the TOC format identification code TVN recorded in the No. 564 free line FL in the lead-in area is confirmed. Then, the position of the pickup is controlled so that the TOC data can be read.

(3) Chapter address code CADR (FIG. 12)

The chapter address code CADR is a code showing the structure of a chapter of the video disk in which the disk code DSCD is recorded. As shown in FIG. 12, the chapter address code CADR has code contents different from each other for different recording areas. A description will now be given of the name and meaning of each bit in the chapter address code CADR.

CF: Chapter number code identification bit
  CF="0" when the chapter numbers on one side of the video disk are independent of those on the other side thereof.
  CF="1" when the chapter numbers continue from the side 1 to the side 2.
TCN: Total chapter number code in the disk side
  MSB leading binary type
  CF="0" when a maximum of 124 chapters is available on each of the sides 1 and 2 (LCN="111 1100").
  CF ="1" when a maximum of 124 chapters is available on the side 2.
CHN: Chapter number code
  MSB leading binary type
  The beginning of the chapter number is 0 or 1.
  Number next to the last chapter number of a program which continues from one side of the video disk to the other side.
  Continuous values in a program track.
  A maximum chapter number is 124 (CHN="111 1100").
  CHN is invalid when TCN="000 0000".
*: Undefined (4) First frame address code FADR1 (FIG. 13)

The first frame address code FADR1 includes a universal frame number code UFN in which continuous frame numbers are assigned to areas from the lead-in area to the lead-out area through the program area. The universal frame number code UFN is combined with an area identification code ADST indicating which area the universal frame number code UFN relates to. As shown in FIG. 13, the bit allocation of the first frame address code FADR1 is such that the universal frame number code UFN is assigned to bits 0-16, and the area identification code ADST is assigned to bits 17 and 18.

FIG. 14 shows an example of data of the universal frame number code UFN. A lead-in start address is "1FC21" in hexadecimal notation and a lead-in end address is "1FFFF" in hexadecimal notation when the lead-in area corresponds to 33 seconds. Similarly, a program start address is "00000", and a program end address is "1A5DF". The address "1A5DF" indicates the number of frames when the program area amounts to one hour, and corresponds to frames "0-107999" in decimal notation.

By designing the universal frame number code UFN so that it assumes continuous values from the lead-in area to the lead-out area, it becomes possible to generate the universal frame number code UFN by a simple carry operation of a counter when the disk code DSCD is assigned to the video disk 7A and to use the disk code generation circuit 3 having a simple configuration. Further, during the reproduction of information from the video disk 7A, it is possible to easily control the position of the pickup for searching because the universal frame number code UFN assumes the continuous values.

Moreover, since the area identification code ADST indicating the area related to the video frame being considered is recorded together with the universal frame number code UFN, it becomes possible to simultaneously read the address of the video frame and the recording area related to the above video frame when the disk code DSCD is read during the reproducing operation on the video disk. Hence, it is easy to identify the current pickup position and correct the reproducing position of the pickup, even if the pickup overshoots the lead-in area during an initial searching operation after the reproducing operation on the video disk is started, that is, during a search operation in which address 0 of the video frame in the program area is searched for. Further, it is easy to control the pickup position carried out when the pickup is moved in order to search an area in the vicinity of the last video frame in the program area. Hence, it is possible to easily control the position of the pickup if the pickup moves over a boundary of the recording area on the video disk and improve controllability.

(5) Second frame address code FADR2 (FIG. 15)

The second frame address code FADR2 is a code mainly intended to show information concerning the video frames. The contents of the second frame address code FADR2 are shown in FIG. 15. The name and meaning of each code related to the second frame address code FADR2 will now be described.

ST: Picture stop bit
  The operation is automatically switched to a still picture reproducing operation in accordance with the contents of a still picture mode identification code SPC when ST="1".
SPC: Still picture mode identification code
  A data format of the still picture mode identification code SPC is shown in FIG. 16.
LFN: Universal frame number code of the last program video frame of the program
  The data format is a MSB leading binary format.
CFN: Frame number code in each chapter and lead-out area
  MSB leading binary format
  Continuous values in the video frames in each chapter and the video frames in the lead-out area.
  CFN="0 0000 0000 0000 0000" in each chapter and the lead-out start video frame
: Undefined In the above-mentioned format of the disk code DSCD, the total chapter number code TCN in the side is written into the chapter address code CADR in the lead-in video frame (FIG. 12), and the universal frame number code LFN in the last video frame in the program is written into the second frame address code FADR2 in the lead-in video frame.

Since the universal frame number code LFN of the program last video frame is written into the free line FL having line number 564 in the lead-in area, it is possible to detect the recording length of information recorded on the video disk 7A by simply reading the free line FL having line number 564 without reading the TOC data. Hence, it is possible to obtain the recording length of information recorded on the video disk 7A even if a video disk player is used which has a specification in which only the No. 564 free line FL in the lead-in area is read and the TOC data is not read. Hence, it is possible to easily predict a pickup movement distance during search operation and to improve controllability.

The total chapter number code TCN is recorded, together with the above-mentioned number code LFN, in the No. 564 free line. Hence, if an inputting operation is erroneously performed during a special reproducing operation, for example, if a chapter which is not present in the video disk 7A is specified, it is possible to determine that the above inputting operation has an error without reading the TOC data. Hence, it is possible to prevent unnecessary movement of the pickup and improve controllability.

[VI] Structure of TOC data

A description will now be given of the structure of the TOC (Table of Contents) data recorded on the lead-in area on the video disk 7A. The TOC data contains information concerning the configuration and length of information recorded on the video disk 7A.

As shown in FIG. 17, the TOC data is recorded in a block unit. That is, a TOC data block TBLK is a unit of one video frame, and has a data structure which is completed within one video frame. The reason why the TOC data is designed to have the above block structure is that the TOC data can be managed in the block unit and written into a RAM built in the microcomputer in the block unit. As will be described later, use of the TOC data having the block structure cooperates with a recording in which identical TOC data blocks TBLK are multiplexed and repeatedly recorded (in 30 frames or more). Hence, if a dropout takes place during the reproducing operation and some information is lost, it is possible to re-read information by a Jump-back operation in which information is read in the frame unit.

There are recorded at least 30 TOC data blocks TBLK (30 video frames) located backwardly from the last video frame in the lead-in area. This arrangement in which at least 30 TOC data blocks TBLK are recorded is intended to ensure a margin in a re-reading area which is read when a dropout occurs in the reproduced RF signal due to track jumping of the pickup during the reproducing operation.

As shown in FIG. 18, each TOC data block TBLK is located in a video signal transmission area of video signals (C and Y video signals) in the MUSE signal transmission signal format (see FIG. 3). The video signals are not arranged in the lead-in area since they are not necessary, and a Y video signal area which originally has a black level is utilized. In one video frame, a video signal area is defined in each video field. One video signal area consists of 516 lines from line No. 47 to line No. 558. Another video signal area consists of 516 lines from line No. 609 to line No. 1120. C and Y video signal transmission areas are formed in each of the two 516 line areas. However, the C and Y video signal transmission areas are not needed, and hence an area between sample No. 13 and sample No. 480 is used as a TOC data area.

In the present embodiment, the TOC data is arranged in an area starting from the No. 48 line and ending with the No. 552 line, and pieces of TOC data having TOC data No. 1-TOC data No. 64 are arranged at equal intervals of eight lines. Further, the TOC data is arranged in an area starting from the No. 610 line and ending with the No. 1114, and pieces of TOC data having TOC data No. 65-TOC data No. 128 are arranged at equal intervals of eight lines. Hence, 128 lines are provided in total for storing TOC data. In the above-mentioned manner, the TOC data is arranged in the No. 48+8n (n denotes the line number) lines and the No. 610 +8n lines so that the TOC data does not overlap the frame pulses FP arranged in the line Nos. 1 and 2 and the control signals arranged in the line Nos. 559–563 and 1121–1125. Hence, it is possible to prevent the interference to the MUSE decoder due to the TOC data during the reproducing operation on the video disk 7A.

The reason why the TOC data starts from the No. 48 line is, in addition to the above-mentioned aspect, that "gray level data" for settling of signal levels is arranged in a line located immediately before the TOC data. That is, the start line of the Y video signal area which is a usable area is the No. 47 line, and the gray level data is arranged in the No. 47 line. The TOC data is arranged in the No. 48 line immediately subsequent to the No. 47 line. The same thing can be said about the No.610 line. The gray level data will be described in detail later.

The arrangement in which the TOC data is arranged every eight lines is based on the relation with the processing speed of the microcomputer in the video disk player. Since the TOC data is arranged every eight lines, a one-line period is equal to 29.6296 $\mu$s. Hence, the TOC data is reproduced at intervals of:

$$29.6296 \ \mu s \times 8 = 237.03 \ \mu s.$$

The quantity of data which should be read within the above period is equal to 64 bits (8 bytes) other than the header SYNC in the 76-bit disk code DSCD. Hence, it is possible to read the above 64 bits within a period of 237.03 $\mu$s by means of general microcomputers.

[VII] TOC data format

FIG. 19 shows the format of the TOC data. As shown in FIG. 19, the TOC data has the same format as the disk code DSCD inserted into the No. 564 free line FL. The use of the common format makes it possible to commonly use the disk code reader 19 (FIG.2) in order to read the disk code DSCD and the TOC data, bringing an advantage of simple hardware structure.

In FIG. 19, the TOC data includes, from sample No. 13 to sample No. 480, a header SYNC, an in-TOC information identification code TMODE, a chapter information code CIMFO, a frame information code FIMFO, an extended data code EDATA, and an error detection code CRCC.

(1) Header SYNC (FIG.20)

The header SYNC has the same format as the disk code DSCD (FIG. 10).

(2) In-TOC information identification code TMODE (FIG. 21)

The in-TOC information identification code TMOD is a code showing information concerning a TOC which is a table of contents of the TOC data. The name and meanings of each bit in the in-TOC information identification code TMODE will be described below.

PF: Multiplexing period identification bit

The same definition as No. 564 line data; PF=1 in the TOC data line.

IDX: In-TOC identification code

Code for identifying CIMFO (chapter number information in each TOC data line) and FIMFO (frame number information in each TOC data line)

The contents of CIMFO and FIMFO are invalid when IDX="00". See a table shown in FIG. 22 in other cases.

TS: Disk side identification bit

TS="0" when the CIMFO and FIMFO have the contents of disk side 1, and TS="1" when the CIMFO and FIMFO have the contents of disk side 2.

It is possible by use of the TS to specify, in the TOC, information concerning only a side identical to the recording disk side or information concerning both of the sides on the basis of the data contents of the CIMFO and FIMFO, AF: EDATA valid identification bit
AF="0" when EDATA (extended data) in each TOC data line is invalid, and AF="1" when EDATA in each TOC data line is valid,

*: Undefined (3) Chapter information code CIMFO and (4) frame information code FIMFO (FIG, 22)

These code indicate information of the chapter of the program area and its corresponding video frame of the video disk 7A, and have following contents, SCN1: Program start chapter number on disk side 1
MSB leading binary format
Recorded on TOC data line No, 1

SCN2: Program start chapter number on the disk side 2
MSB leading binary format
Recorded on TOC data line No, 2

LCN1: Program end chapter number on disk side 1
MSB leading binary format
Recorded on TOC data line No, 3

LCN2: Program end chapter number on disk side 2
MSB leading binary format
Recorded on TOC data line No, 4

LFN1: Universal frame number of the last video frame on disk side 1
MSB leading binary format
Recorded on TOC data line No. 3

LFN2: Universal frame number of the last video frame on disk side 2
MSB leading binary format
Recorded on TOC data line No. 4

SCNn: Chapter number on the disk side specified by TS
MSB leading binary format
n=1 to m (m is equal to or smaller than 124)

SFNn: Start universal frame number of a chapter specified by SCNn
MSB leading binary format
n=1 to m (m is equal to or smaller than 124)

Figure 23:
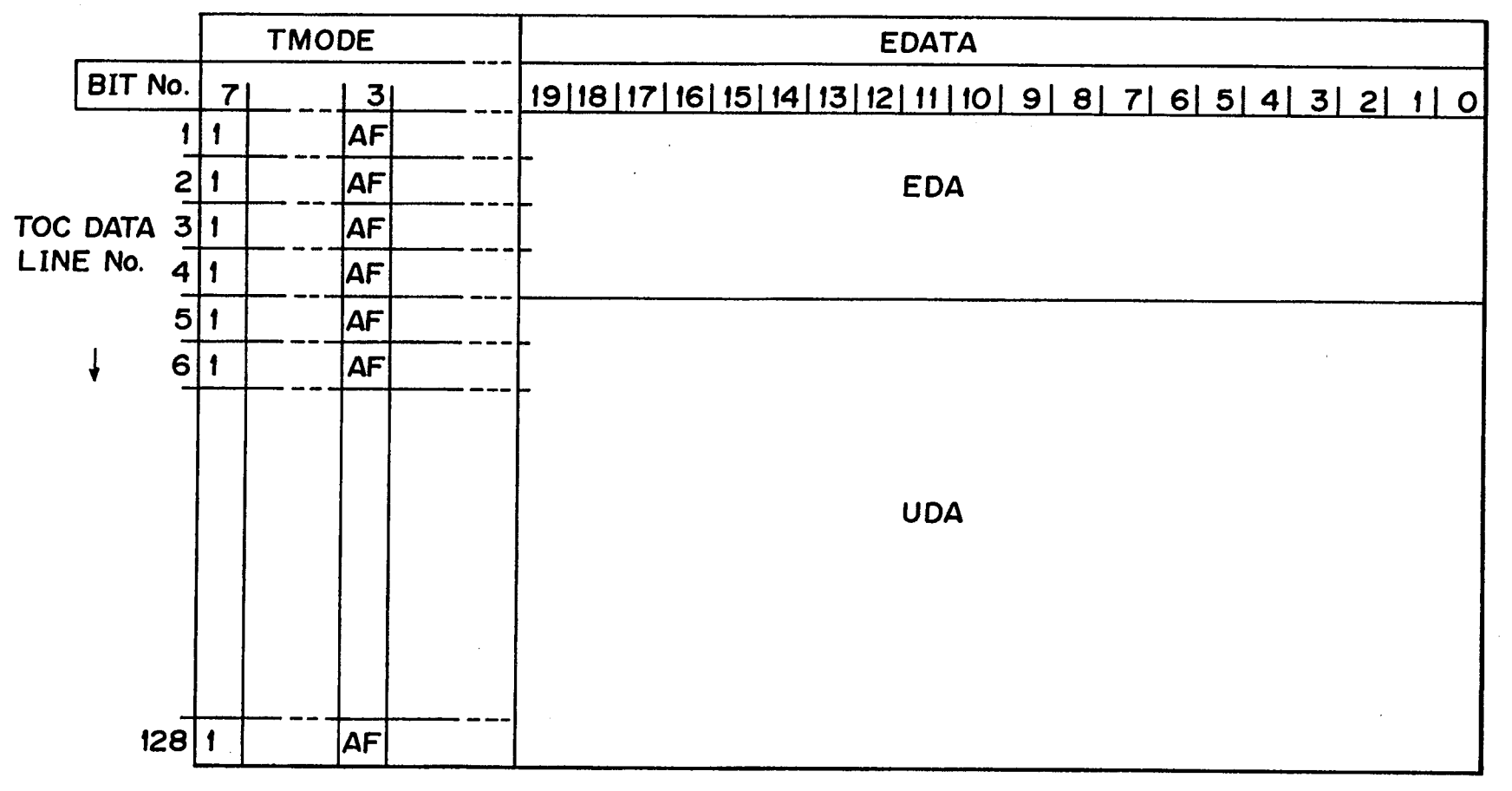

*: Undefined bit (5) Extended data code EDATA (FIG.23)

This code indicates additional information other than information concerning the structure of information on the video disk 7A, and an area for the users, and has the following contents.

EDA: Extended data area
Manufacturer identification and catalog number code
Recorded on TOC data line Nos. 1-4
EDA is invalid when AF="0" and valid when AF="1".

UDA: User data area
Undefined
Recorded on TOC data line Nos. 5-128
UDA is invalid when AF="0", and valid when AF="1".

[VIII] Gray level

As shown in FIG. 18, gray level data GLV is arranged in a line immediately prior to each TOC data. That is to say, one gray level data GLV is paired with one TOC data located in the same line as the above gray level data GLV.

The gray level has the same definition as a clamp level, and its signal level is an 8-bit quantized level and has a value of "128/256". The quantized level is a level obtained by quantizing the range, which has a minimum value of "0" and a maximum value of "255", with equal 256 quantization levels as in the case of the disk code DSCD. In the example being considered, the gray level is equal to "128/256". However, it is also possible to use a gray level slightly different from the above gray level. However, it is desired to use a gray level (intermediate level) approximately equal to a slice level used for reading the TOC data.

A description will now be given for the function of the gray level data GLV.

Figure 24:
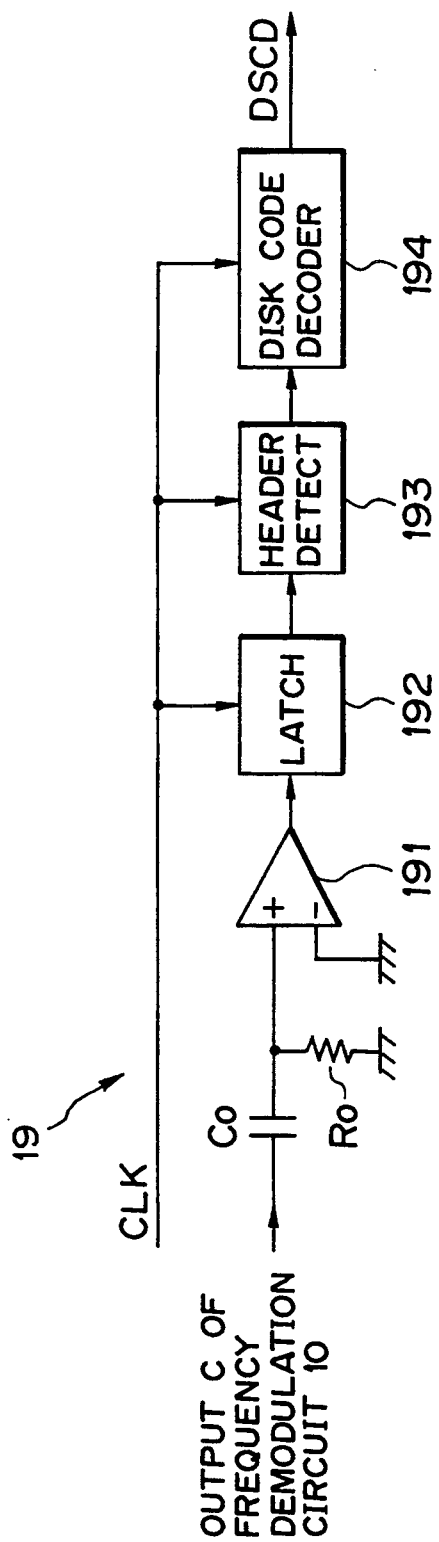
FIG. 24 is a circuit diagram of a disk code reader.

FIG. 24 is a circuit diagram of the disk code reader 19 (see FIG. 2). The output c of the frequency demodulation circuit 10 is applied to a positive input terminal of a comparator 191 via a coupling capacitor Co. The positive input terminal of the comparator 191 is grounded via a bias resistor Ro. A negative input terminal of the comparator 191 is grounded.

An output signal of the comparator 191 is applied to a latch circuit 192, which comprises a D-type flip-flop. A reference clock CLK is supplied to an clock input terminal of the latch circuit 192. The latch circuit 192 stores the output signal of the comparator 191 until the next reference clock CLK is generated. An output signal of the latch circuit 192 is supplied to a header detection circuit 193.

The header detection circuit 193 comprises a digital comparator, which compares the pattern of the input code with the header SYNC of the disk code DSCD or TOC data, that is, a reference code including the same pattern as an 8-bit synchronizing pattern code. The result of this comparison is outputted, as a detection signal, by the header detection circuit 193. The detection signal outputted by the header detection circuit 193 is supplied to a disk code decoder 194. The output signal of the latch circuit 192 is sequentially written into the disk code decoder 194 in response to the header detection signal. The disk code decoder 194 determines whether or not a predetermined number of bits of bi-phase-modulated data has been received. When the result of this determination is affirmative, the disk code decoder 194 outputs data DSCD indicating the contents of the disk code.

The disk code signal DSCD or TOC code signal in the MUSE signal c inputted to the comparator 191 is bi-phase-modulated in order to avoid the influence of a DC component, and is therefore made free from the DC component. Hence, the above code signal from which the DC component has been eliminated by means of the coupling capacitor Co is an alternate signal around zero level. The comparator 191 using a zero-cross comparator detects the rise edge and fall edge of the code signal with respect to the slice level corresponding to zero level. The gray level data GLV is a signal having an intermediate level equal to 128/256, and has a level approximately equal to the slice level of the comparator 191. Since the gray level data GLV is arranged immediately prior to the TOC data without exception, the gray level data GLV is inputted before the TOC data on the time base.

Figure 25:
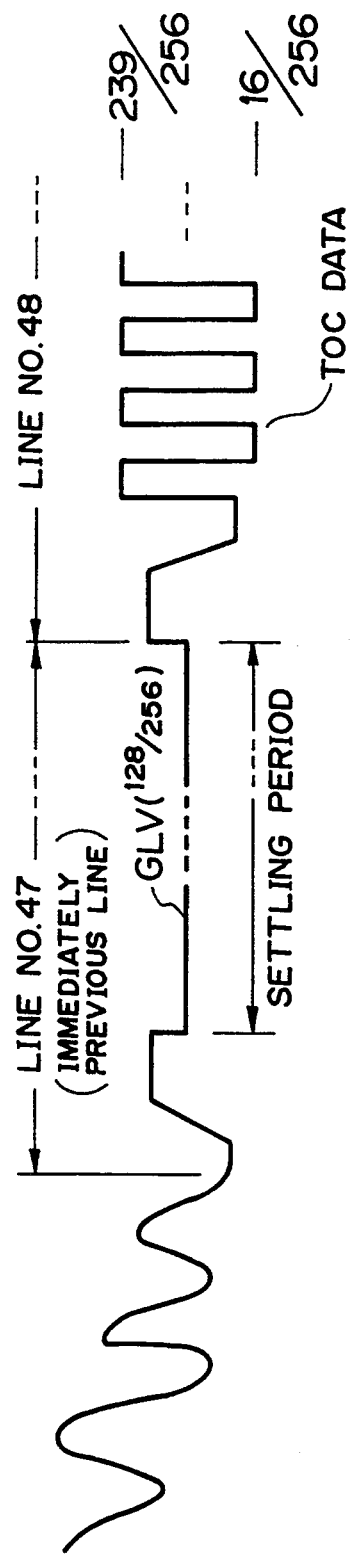
FIG. 25 is a diagram showing a settling effect by means of a gray level code (GLV).

At this time, as shown in FIG. 25, the intermediate level of the MUSE signal C can be automatically settled at the slice level immediately before the TOC data is inputted irrespective of the state of a signal preceding the gray level data GLV as long as the values of the capacitor Co and the resistor Ro are suitably selected. By providing the settling period immediately prior to the TOC data by means of the Gray level data GLV, the disk code reader 19 can correctly detect the edge of the TOC data from the leading bit thereof, and hence the TOC data can be correctly decoded.

In the above-mentioned manner, a clamp circuit for holding the signal levels is not needed by arranging the gray level data GLV in the line immediately prior to each piece of TOC data. Thus, as shown in FIG. 24, the disk code leader 19 can be connected to the output terminal of the frequency demodulation circuit 10 via a simple capacitance coupling using the capacitor Co, and can be configured by a simple structure.

According to the present invention, since TOC information is recorded on the lead-in area on the video disks, it becomes possible to improve controllability and operationability of the video disk players. Further, it is possible to improve management of TOC information and controllability of reproducing operation due to an arrangement in which the TOC information has a data structure completed in the frame unit and is repeatedly written into a plurality of frames.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording and reproducing information on a video disk having a program area and a lead-in area, in which a plurality of frames are arranged in a circular direction, comprising the steps of:

recording a video signal on the program area of the video disk;

recording table-of-contents data, to control reproduction of the recorded video signal, on each of the plurality of frames in the lead-in area of the video disk, said table-of-contents data including at least chapter number information and frame number information for all chapter numbers and frame numbers of the recorded video signal in the program area and having a data structure which is completed in each of said plurality of frames in the lead-in area and the table-of-contents data is identically repeated in each of said plurality of frames adjacent to each other;

reading the table-of-contents data from one of the plurality of frames and storing the read table-of-contents data before reproducing the video signal; and performing chapter number search and frame number search on the basis of the stored table-of-contents data, to reproduce the video signal from the program area.

2. A method as claimed in claim 1, wherein said video signal comprises a MUSE (Multiple Sub-Nyquist Sampling Encoding) signal, and said table-of-contents data is recorded in a video signal area of said MUSE signal.

3. A method as claimed in claim 2, wherein said table-of-contents data recording step comprises the step of recording the identical table-of-contents data repeatedly at predetermined intervals.

4. A method as claimed in claim 2, wherein said table-of-contents data has a block structure completed in each of said frames.

5. A method as claimed in claim 1, further comprises the step of recording a control code on an undefined area of the video disk in a MUSE (Multiple Sub-Nyquist Sampling Encoding) system.

6. A method as claimed in claim 5, wherein said undefined area of the video disk comprises a free line having a line number 564 in the MUSE signal.

7. A method as claimed in claim 5, wherein said control code comprises an identification code showing whether or not the table-of-contents data is recorded.

8. A method as claimed in claim 1, wherein said identical table-of-contents data is repeatedly recorded on more than thirty frames in said lead-in area.

9. A method as claimed in claim 1, wherein said video disk has front and back sides each having the program area, and, in the table-of-contents data recording step, the table-of-contents data for both the front and back sides is recorded, to permit direct access to the video signal recorded on the front and back sides.

* * * * *